(12) United States Patent
Matsumoto et al.

(10) Patent No.: US 7,535,457 B2
(45) Date of Patent: May 19, 2009

(54) FORCE-FEEDBACK INPUT DEVICE

(75) Inventors: Ken Matsumoto, Iwate-ken (JP); Yuji Ito, Aichi-ken (JP); Nozomi Kitagawa, Aichi-ken (JP); Takeshi Haruyama, Aichi-ken (JP); Hiroaki Sasaki, Aichi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 538 days.

(21) Appl. No.: 10/983,783

(22) Filed: Nov. 8, 2004

(65) Prior Publication Data

US 2005/0099387 A1 May 12, 2005

(30) Foreign Application Priority Data

Nov. 10, 2003 (JP) ............................. 2003-380111

(51) Int. Cl.
*G06F 3/033* (2006.01)
(52) U.S. Cl. ...................................... 345/161; 345/157
(58) Field of Classification Search ................. 345/161, 345/156, 157, 163
See application file for complete search history.

(56) References Cited

U.S. PATENT DOCUMENTS

| | | | |
|---|---|---|---|
| 5,825,308 A | 10/1998 | Rosenberg | |
| 5,956,016 A * | 9/1999 | Kuenzner et al. | 345/156 |
| 6,219,032 B1 * | 4/2001 | Rosenberg et al. | 345/157 |

FOREIGN PATENT DOCUMENTS

| | | |
|---|---|---|
| JP | 07-120247 | 12/1995 |
| JP | 08-314637 | 11/1996 |
| JP | 2003-122435 | 4/2003 |

OTHER PUBLICATIONS

U.S. Appl. No. 10/983,865, filed Nov. 8, 2004, Ken Matsumoto.
Search Report dated Jan. 2, 2007 for corresponding European Patent Application No. 04 02 6592.
Office action issued in corresponding Japanese Patent Application No. 2003-380111; mailed Jul. 15, 2008.

* cited by examiner

*Primary Examiner*—Richard Hjerpe
*Assistant Examiner*—Stephen G Sherman
(74) *Attorney, Agent, or Firm*—Brinks Hofer Gilson & Lione (57) ABSTRACT

In a force-feedback input device, when the cursor moves on a line parallel to a line between a center of a first button and a center of a second button, an area is determined between a first position, which corresponds to the center of the first button, and a second position, which corresponds to the center of the second button, such that the area extends a distance W on both sides of a mid-point between the first and second positions. In this area, the first and second external-force generation portions are controlled so that a scalar value |F| of an attractive force exerted on an operating portion is decreased according to the equation |F|=d/W·|F| as the cursor moves closer to the mid-point, where d is a distance between the cursor and the mid-point.

1 Claim, 10 Drawing Sheets

FORCE-FEEDBACK INPUT DEVICE

This application claims the benefit of priority to Japanese Patent Application No. 2003-380111 filed on Nov. 10, 2003, herein incorporated by reference.

BACKGROUND OF THE INVENTION

1. Field of the Invention

The present invention relates to a force-feedback input device used for, for example, car navigation systems and, in particular, to an improvement in the operational sensation of an input device having a function of automatically attracting a cursor into a position of a menu-selection button displayed on display means in order to facilitate the selection of a desired button.

2. Description of the Related Art

Input devices are known in which display means displays menu-selection buttons and a cursor, and in which input means allows an operator to select a desired menu by moving the cursor to the display position of the desired button among the menu-selection buttons. In addition, some input means have a function that automatically attracts a cursor to the displayed position of the button to facilitate a movement of the cursor to the displayed button position.

Figure 9:
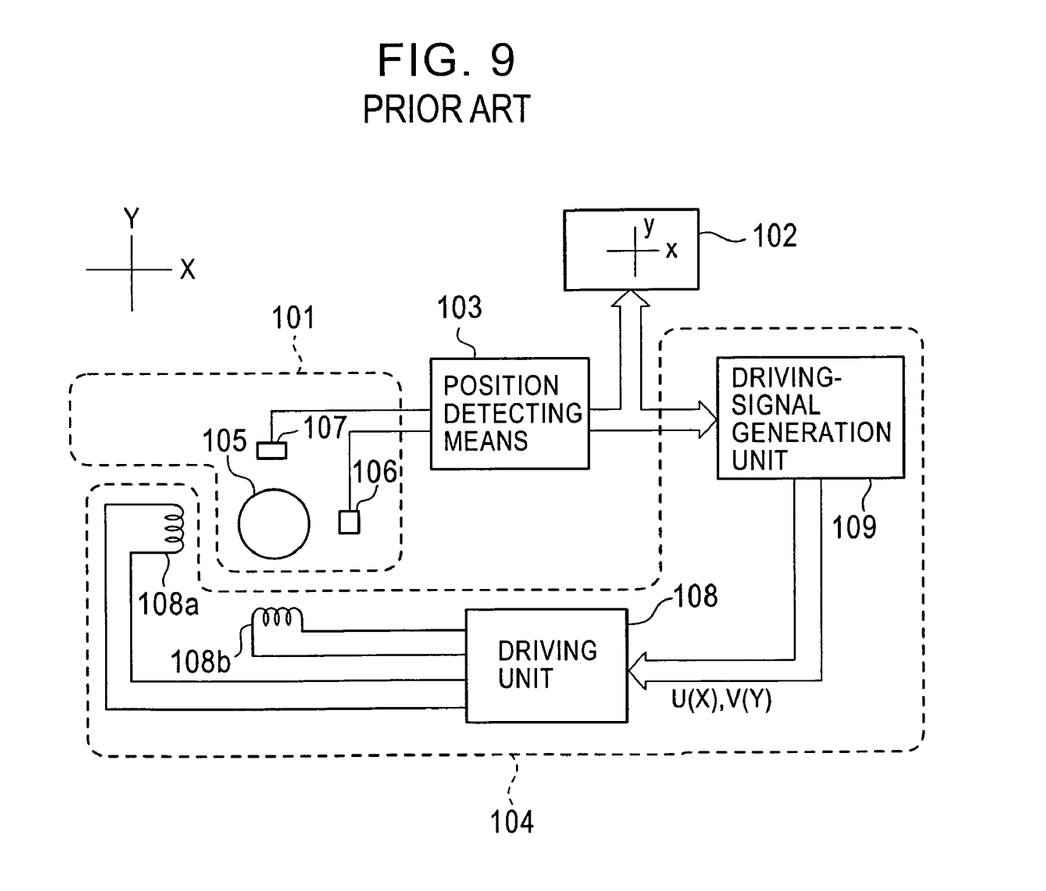
FIG. 9 is a block diagram of a known input device.

FIG. 9 is a block diagram of a known input device having an automatic cursor attraction function. This input device includes input means 101 which is operated by an operator and detects the amount of movement by itself, display means 102 which displays a cursor moved by the input means 101 and input points (buttons), position detecting means 103 which finds the coordinates of the cursor displayed on the display means 102 from the amount of movement of the input means 101, and driving means 104 for providing force-feedback to the input means 101 in accordance with the coordinates of the position of the cursor. The input means 101 includes a rolling ball 105 which moves on a desk while rotating, and rotation-angle detecting means 106 and 107 disposed in accordance with the x-axis and y-axis directions of the display means 102 in order to detect the amount of rotation of the rolling ball 105 in the x-axis direction and in the y-axis direction. The driving means 104 includes a driving unit 108 composed of motors 108a and 108b to drive the rolling ball 105 and a driving signal generation unit 109 for generating a driving signal to drive the driving unit 108 in accordance with a signal from the position detecting means 103 (refer to, for example, Japanese Examined Patent Application Publication No. 07-120247).

Figure 10A:
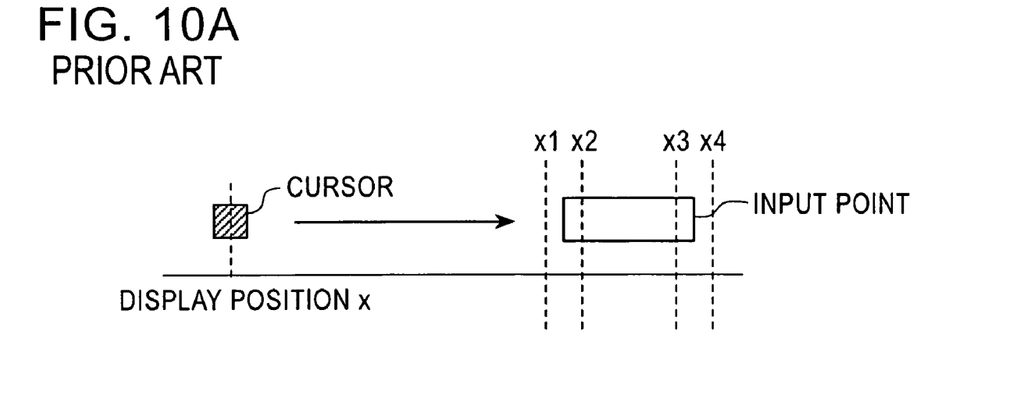
FIGS. 10A, 10B, and 10C are diagrams explaining the operation of the known input device.
Figure 10B:
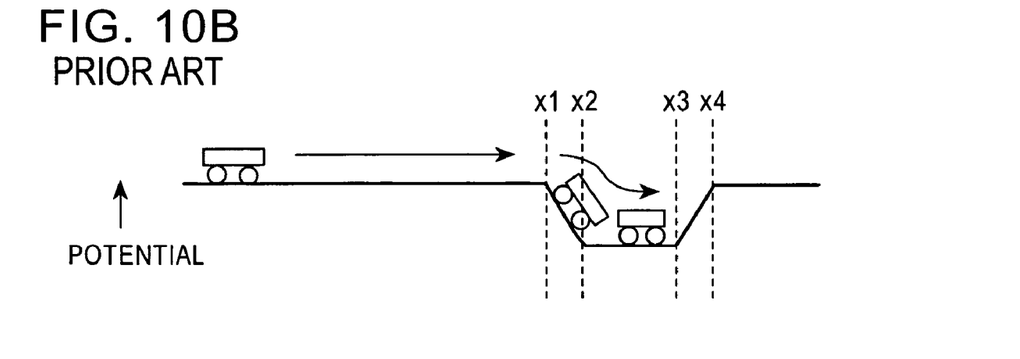
Figure 10C:
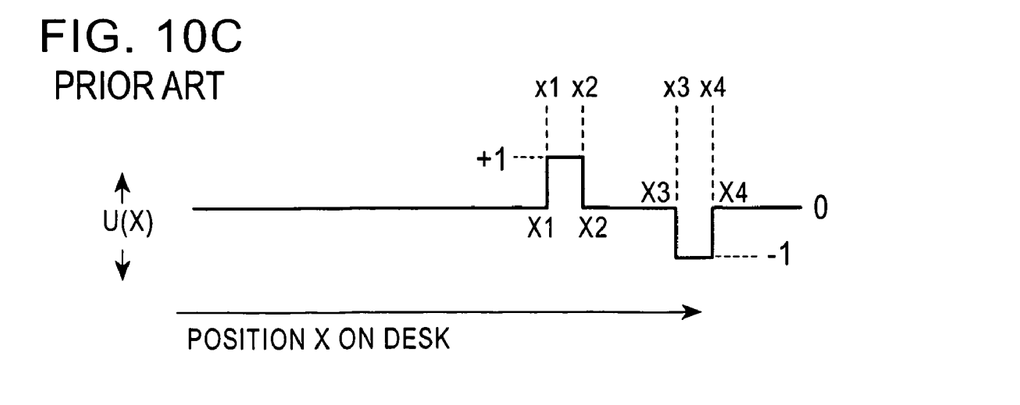

As shown in FIG. 10C, the driving signal generation unit 109 pre-stores a relationship among a relative distance between a cursor and an input point, a relative moving direction of the cursor towards the input point, and a driving signal supplied to the driving unit 108. As shown in FIG. 10A, when the cursor is moved towards the input point by the operation of the input means 101 and the cursor enters the range of $x1 \leq x \leq x2$, the driving signal "+1" shown in FIG. 10C is supplied to the driving unit 108 from the driving signal generation unit 109. Accordingly, a driving force is provided to the rolling ball 105 so that a sensation is provided to the input means 101 as if it is attracted by the input point, as shown in FIG. 10B, and the cursor is attracted to the input point. In contrast, when the cursor is moved away from the input point by the operation of the input means 101 and the cursor enters the range of $x3 \leq x \leq x4$, the driving signal "−1" shown in FIG. 10C is supplied to the driving unit 108 from the driving signal generation unit 109. Accordingly, a resistive force is provided to the rolling ball 105 so that a sensation is provided to the input means 101 as if it is pulled back by the input point.

Therefore, an input device of the above-described structure facilitates the operation for a cursor to move on the desired input point. For example, this input device facilitates the menu selection displayed on the display means 102.

In the above-described known example, it is designed such that, when the cursor moves into a predetermined area for an input point, the cursor is attracted to the display area of the input point by applying a driving signal to the driving unit 108. In addition, in some of the known input devices, a cursor is attracted to the closest input point even when the cursor is placed at any location outside the display area of the input point. That is, the input devices have an infinite attractive area.

Additionally, in the above-described known example, the cursor is not attracted to the center of the input point. However, some of the known input devices move a cursor into the center of the input point.

Furthermore, in the above-described known example, a mouse is used as the input means 101. However, some of the known input devices employ a joystick instead of a mouse.

As described in Japanese Examined Patent Application Publication No. 07-120247, a plurality of menu selection buttons (input points) is normally disposed on display means in various ways. However, the technology described in the publication discloses no method for controlling an attractive force when a plurality of buttons is displayed on display means, in particular, when the buttons are closely located to each other. That is, the strength of the attractive force is controlled based on only the distance between a cursor and one of the buttons. Therefore, when the technology described in that publication is applied to an actual device, and a cursor is moved from the display position of one button or the vicinity of the button to the display position of another button or the vicinity of the button, impact strength occurs in the input means, and therefore, the operability of the input means becomes degraded or the cursor cannot be smoothly moved in the desired direction, which is a problem.

In other words, when a plurality of buttons is displayed on display means, a cursor is attracted in the direction towards the closest displayed button of the cursor. Accordingly, if the closest button changes to another button and the direction of the attractive force is switched while the cursor is moving, the strength of the attractive force abruptly changes. Therefore, unless the strength of the attractive force exerted on the input means is reduced before and after the change, a large impact strength occurs in the input means.

Figure 11:
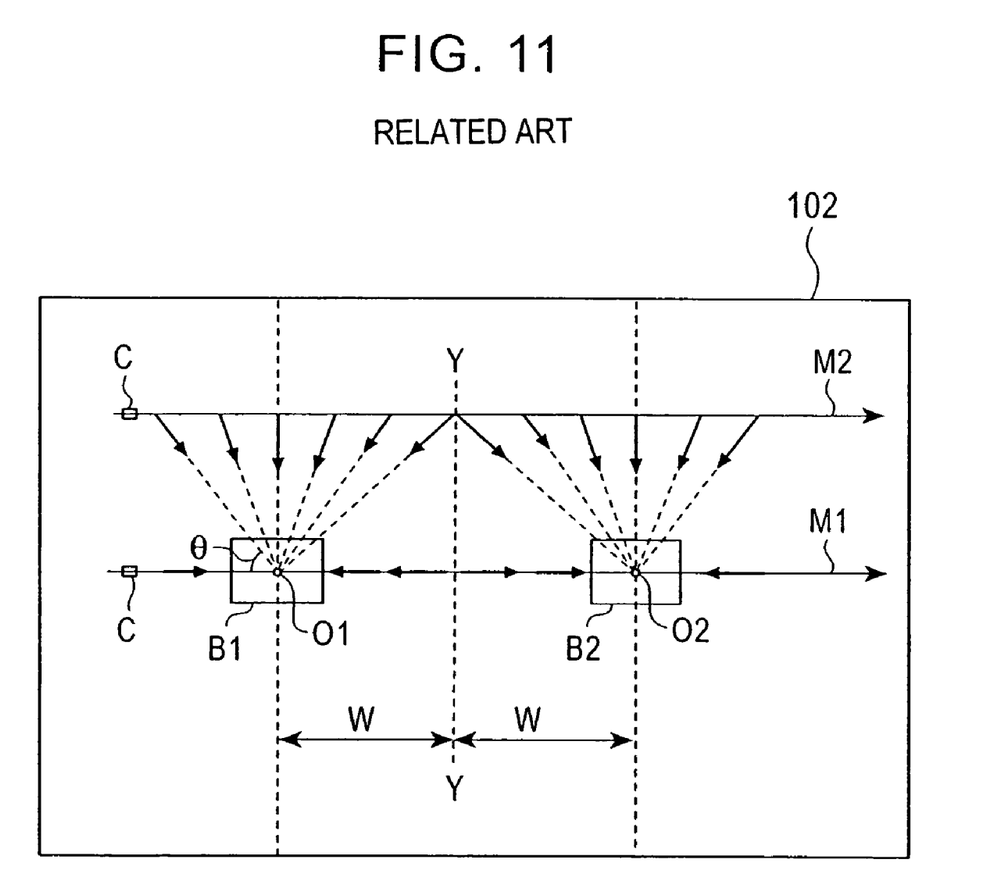
FIG. 11 is a vector diagram illustrating a change in an attractive force exerted on input means when two buttons are displayed on display means.
Figure 12A:
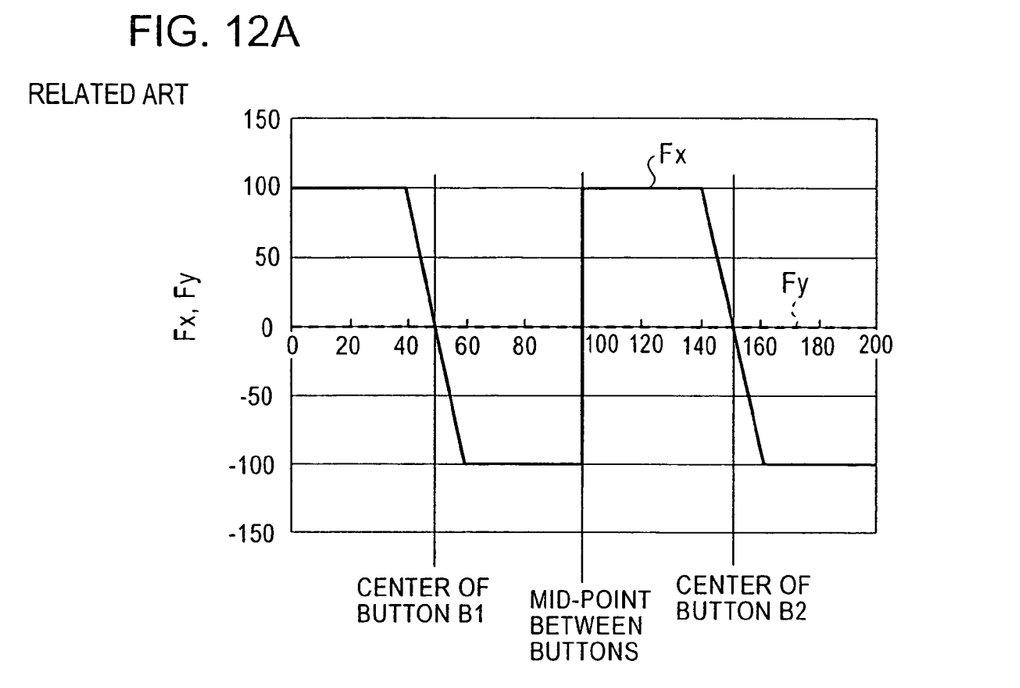
FIGS. 12A and 12B are graph charts illustrating the change in an attractive force exerted on the input means when two buttons are displayed on the display means.

As shown in FIG. 11, two buttons B1 and B2 are displayed in the x-axis direction of the display means 102. The attractive force of a cursor C is determined based on only a distance between the cursor C and the button. For example, the strength of the attractive force is constant. When the cursor C moves from the left of the button B1 to the right of the button B2 on a line M1 between a center O1 of the button B1 to a center O2 of the button B2, a component force Fx of the attractive force in the x-axis direction and a component force Fy of the attractive force in the y-axis direction, as shown in FIG. 12A, are provided to the input means 101 by two driving means, for example, the motors 108a and 108b, disposed along the x-axis direction and the y-axis direction. If the cursor C moves from the left of the button B1 to the right of the button B2 on a line M2 parallel to the line M1, a component force Fx of the attractive force in the x-axis direction and a component force Fy of the attractive force in the y-axis direction, as shown in FIG. 12B, are provided to the input means 101 by the two driving means.

Figure 12B:
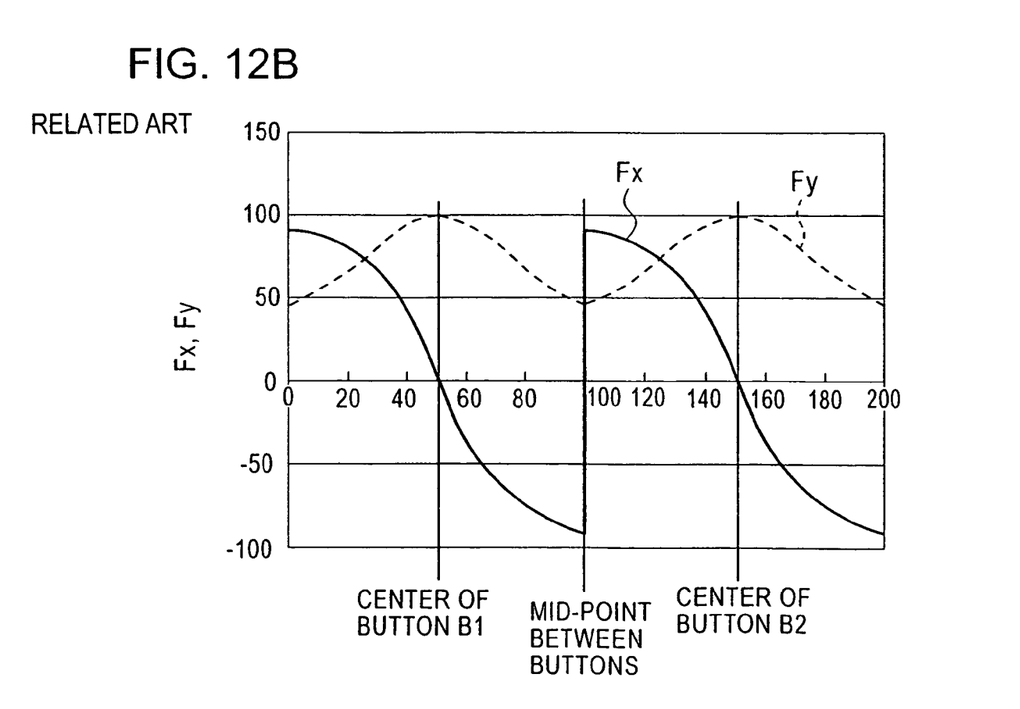

As can be seen from FIGS. 12A and 12B, when an attractive force exerted on the cursor C is controlled only by a distance between the cursor C and a button regardless of the displayed position of the cursor C with respect to the buttons B1 and B2, the direction of a component force Fx of the attractive force in the x-axis direction is reversed at the time when the cursor C passes across the mid-point between the center O1 of the button B1 and the center O2 of the button B2, that is, when the cursor C passes across a center line Y-Y between the buttons in FIG. 11. Accordingly, the strength of the attractive force abruptly changes and, thus, an unnatural click sensation occurs from button to button and provides an operator with an unpleasant sensation.

SUMMARY OF THE INVENTION

Accordingly, it is an object of the present invention to provide a force-feedback input device that does not produce an unnatural click sensation from button to button and, therefore, does not provide an operator with an unpleasant sensation even when a plurality of buttons is displayed on the display means.

According to the present invention, a force-feedback input device includes display means, input means, and control means. The display means displays a cursor and a plurality of buttons. The input means includes an operating portion, a detecting portion for detecting an amount of movement of the operating portion, and an actuator for providing a required external force to the operating portion. The control means controls the display of the cursor based on an operational amount signal from the detecting portion and driving of the actuator so as to provide an attractive force to the operating portion based on the relationship between positions of the cursor and the buttons. The control means controls driving of the actuator based on the relationship between positions of the cursor and a borderline between a first attractive area and a second attractive area appearing in the vicinities of adjacent first and second buttons.

Since driving of the actuator is controlled based on the relationship between positions of the cursor and the borderline between the attractive areas, no unnatural click sensation occurs when the cursor passes across the borderline between the attractive areas by preventing an abrupt change in the strength of the attractive force on the borderline.

Preferably, in the force-feedback input device, the control means controls driving of the actuator such that the attractive force decreases as the distance between the cursor and the borderline decreases.

Since the actuator is controlled so that the attractive force decreases as the distance between the cursor and the borderline is decreased, an abrupt change in the strength of the attractive force on the borderline is prevented. Therefore, no unnatural click sensation occurs when the cursor passes across a borderline between the attractive areas.

According to the present invention, when a plurality of buttons is displayed on display means, a force-feedback input device controls driving of an actuator based on the relationship between a cursor and a borderline of attractive areas. Consequently, abrupt change in the strength of the attractive force on the borderline is prevented and, therefore, no unnatural click sensation occurs when the cursor passes across a borderline between the attractive areas.

DESCRIPTION OF THE PREFERRED EMBODIMENTS

Figure 1:
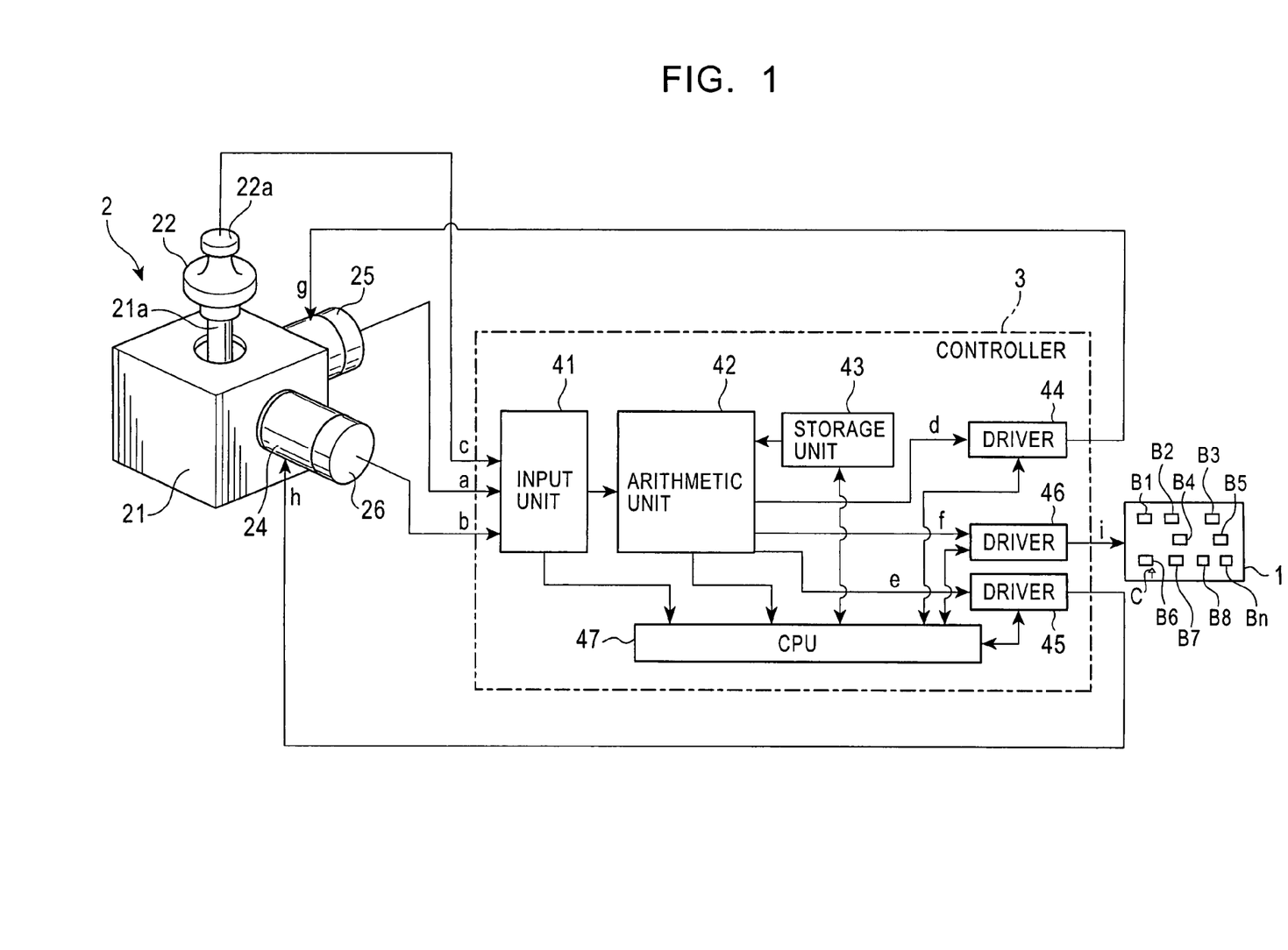
FIG. 1 is a block diagram of a force-feedback input device according to an embodiment of the present invention.
Figure 2:
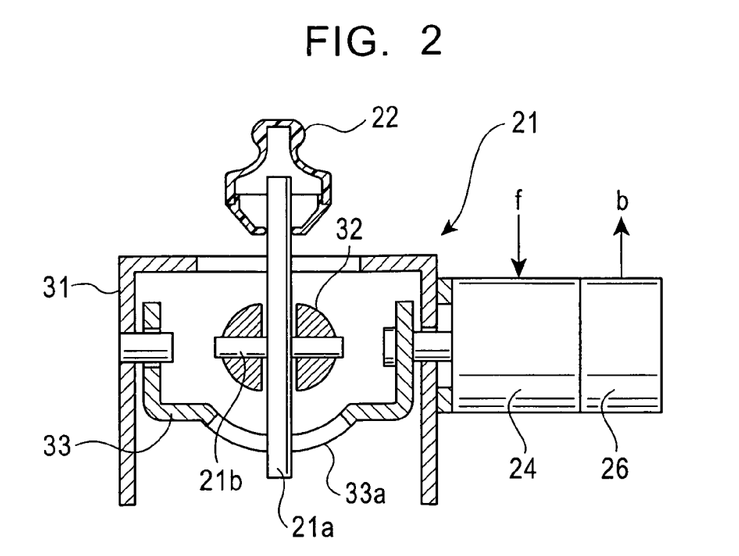
FIG. 2 is a side cross-sectional view of input means according to the embodiment.
Figure 3:
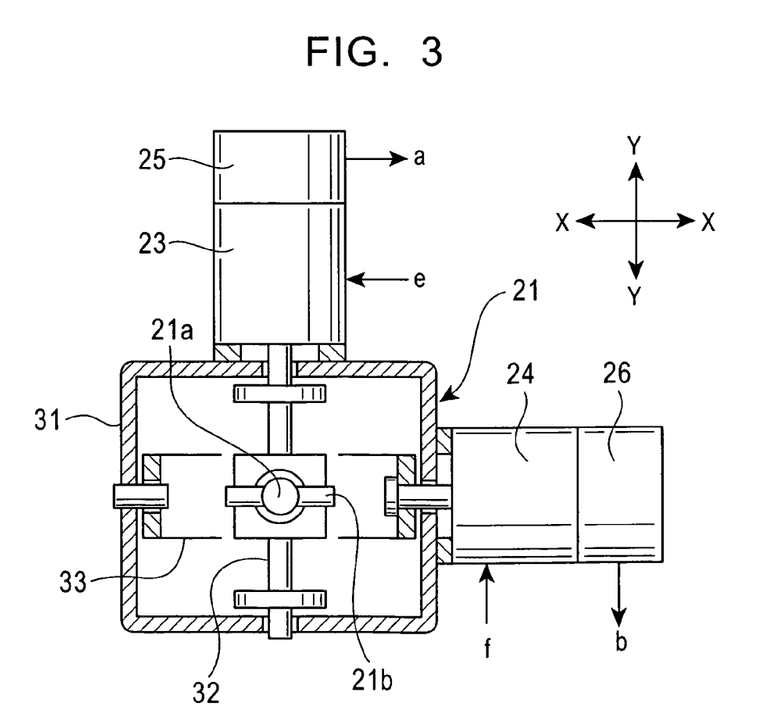
FIG. 3 is a top plan cross-sectional view of the input means according to the embodiment.
Figure 4A:
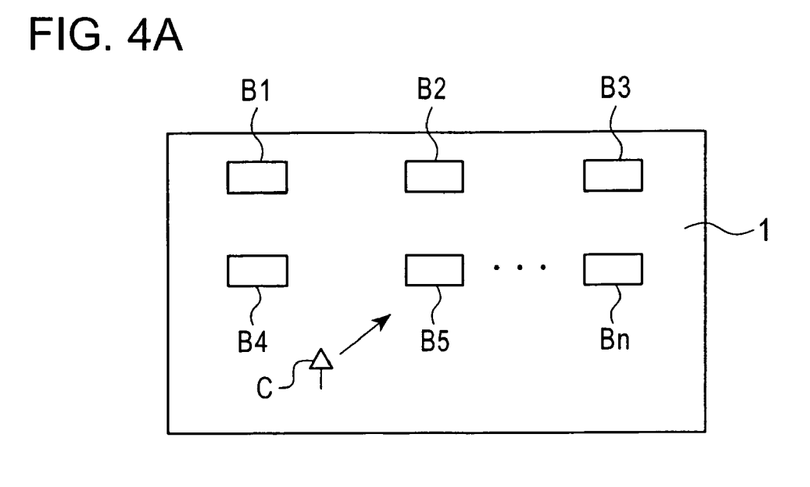
FIGS. 4A, 4B, and 4C are diagrams explaining the operation of the force-feedback input device according to the embodiment.
Figure 4B:
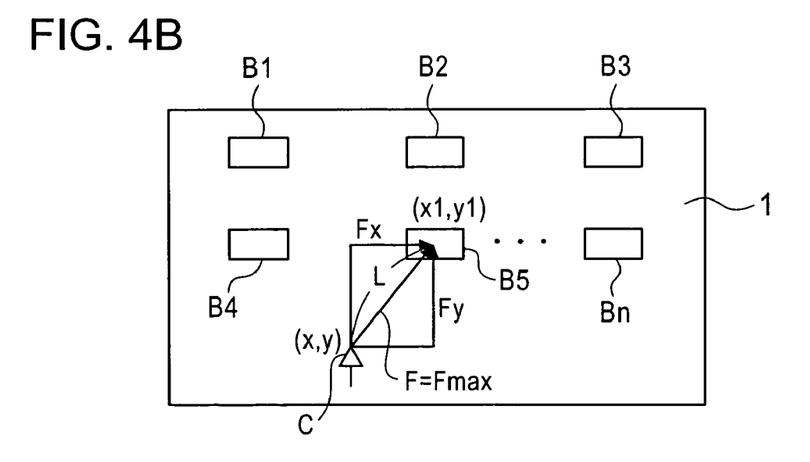
Figure 4C:
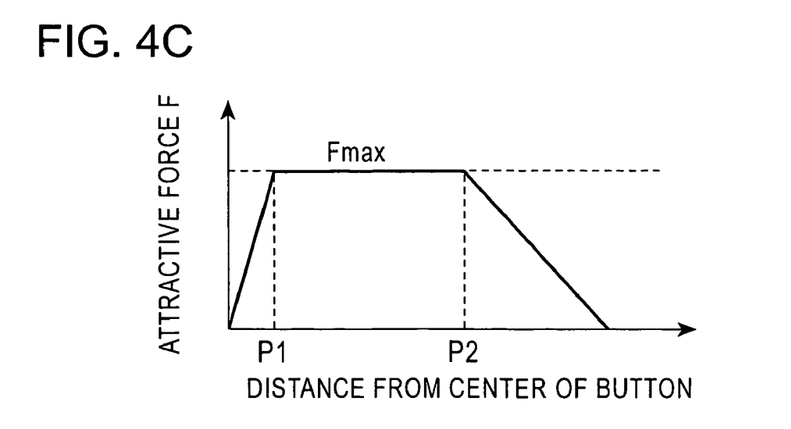
Figure 5:
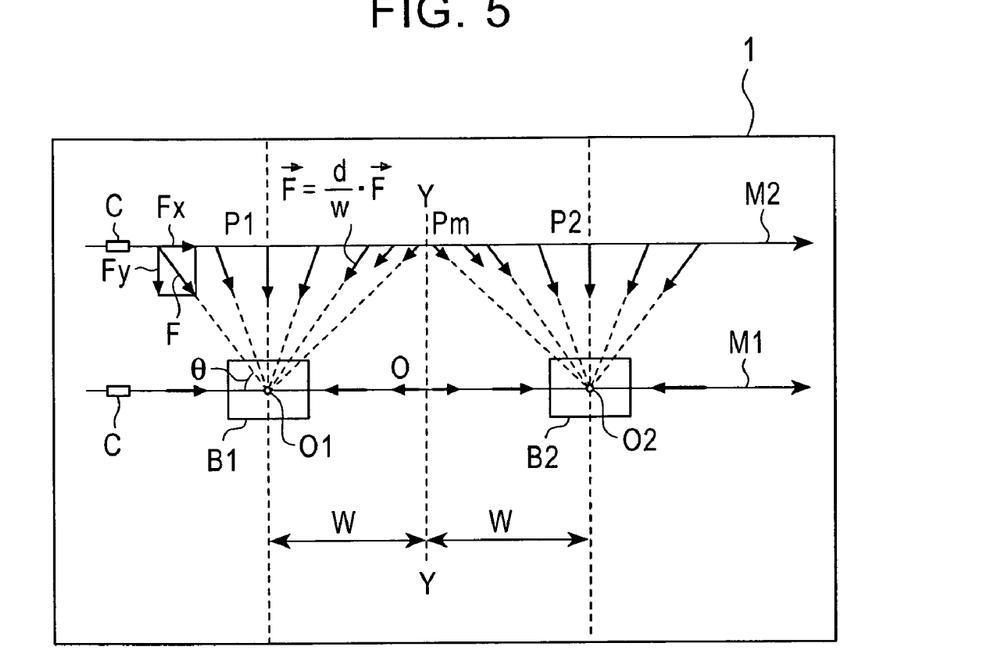
FIG. 5 is a vector diagram illustrating the change in an attractive force exerted on the input means when two buttons are displayed on display means.
Figure 6:
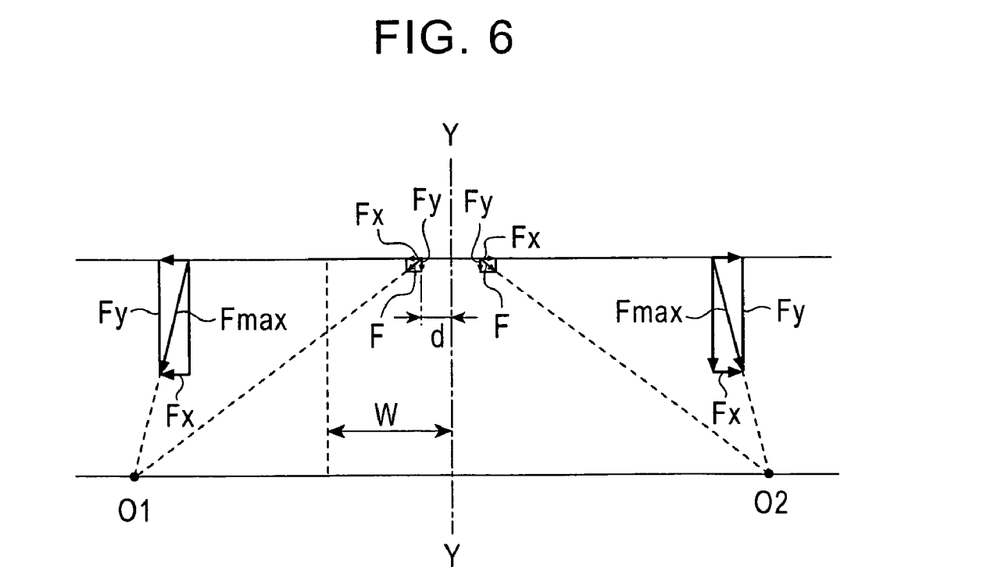
FIG. 6 is a schematic diagram explaining a scheme for controlling the attractive force in the input means according to the embodiment.
Figure 7A:
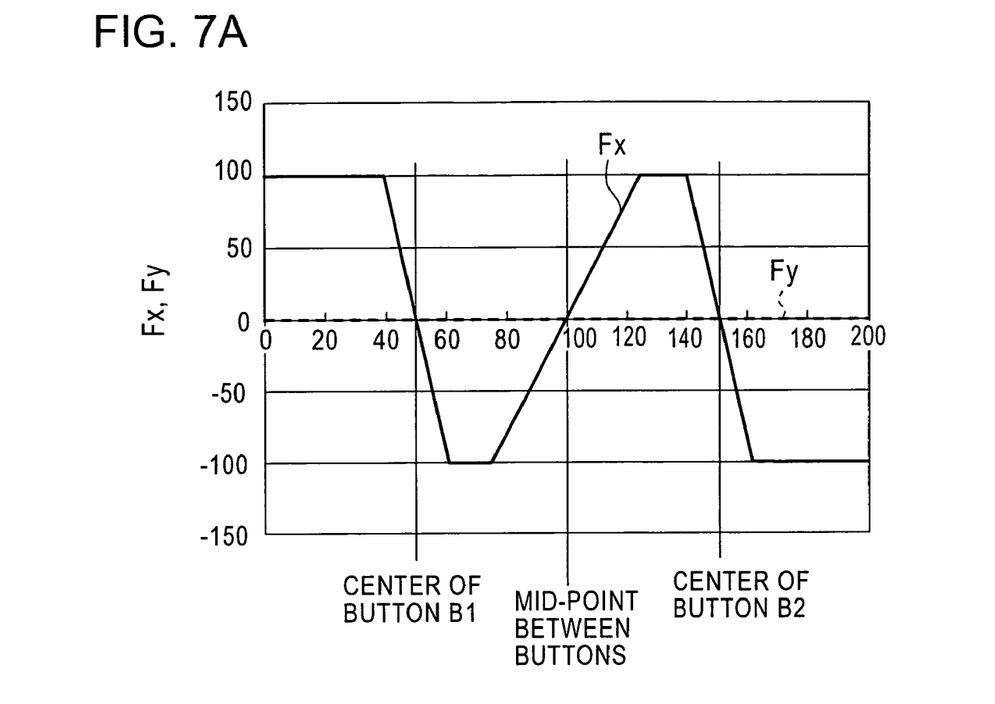
FIGS. 7A and 7B are graph charts illustrating a change in an attractive force exerted on the input means when two buttons are displayed on display means.
Figure 7B:
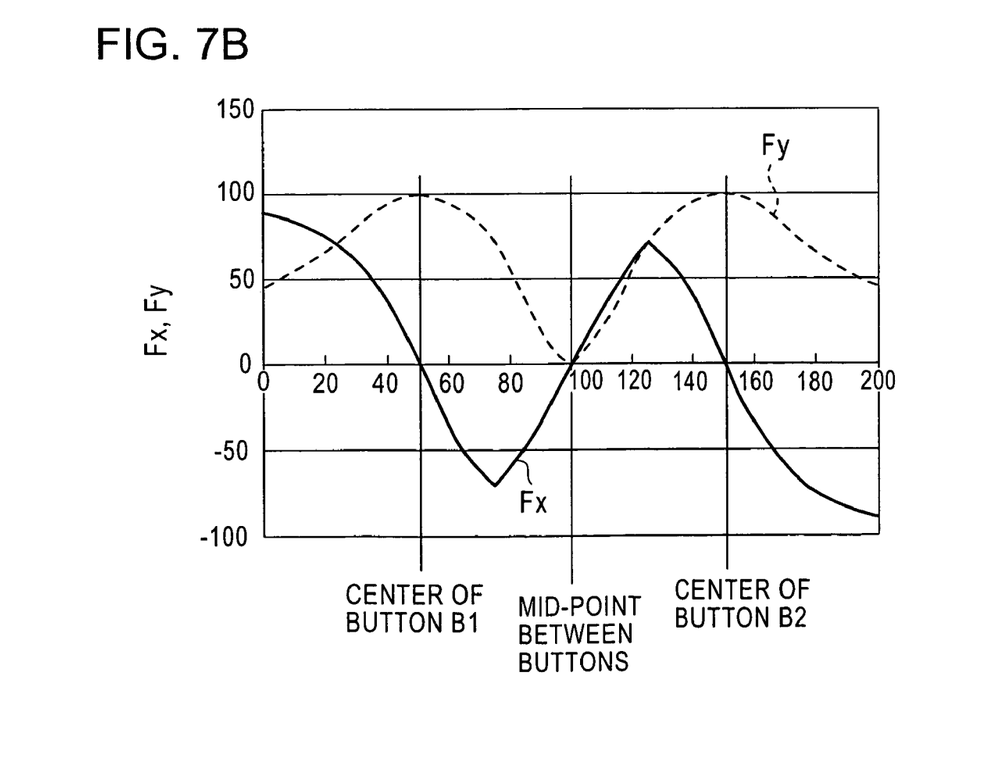
Figure 8:
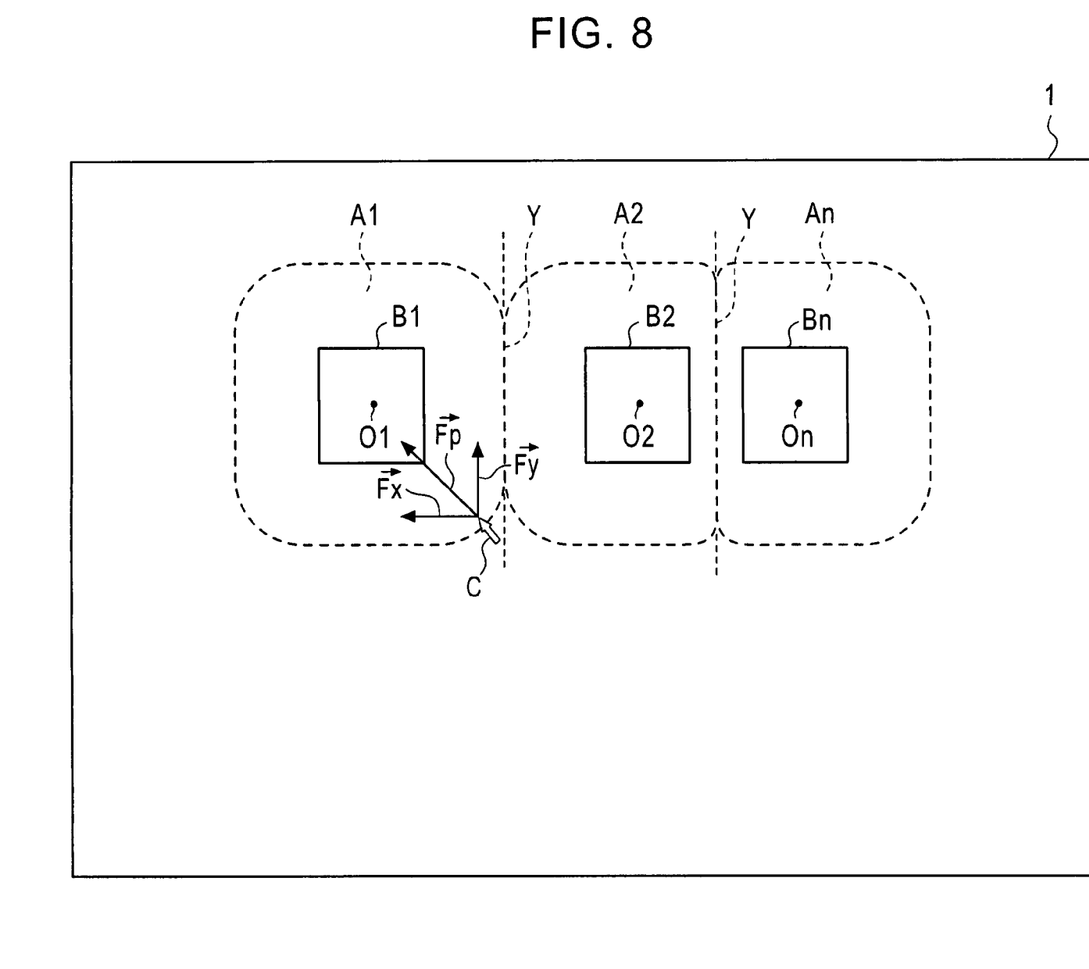
FIG. 8 is a schematic diagram of an attractive area set on the display means.

Embodiments of the present invention will be described below with reference to FIGS. 1 to 8. FIG. 1 is a block diagram of a force-feedback input device according to an embodiment of the present invention. FIG. 2 is a side cross-sectional view of input means according to an embodiment. FIG. 3 is a top plan cross-sectional view of the input means according to the embodiment. FIGS. 4A, 4B, and 4C are diagrams explaining the operation of the force-feedback input device according to the embodiment. FIG. 5 is a vector diagram illustrating a change in an attractive force exerted on the input means when two buttons are displayed on display means. FIG. 6 is a schematic diagram explaining a scheme for controlling the attractive force in the input means according to the embodiment. FIGS. 7A and 7B are graph charts illustrating the change in an attractive force exerted on the input means when two buttons are displayed on display means. FIG. 8 is a schematic diagram of an attractive area set on the display means.

As shown in FIG. 1, a force-feedback input device according to the embodiment includes display means 1 for displaying required images including a cursor C and a plurality of buttons B1 to Bn, input means 2 for moving the cursor C displayed on the display means 1 and selecting one of the buttons B1 to Bn, and control means 3 for controlling the display means 1 and the input means 2.

The display means 1 may be any well-known display device. However, when the input device according to the present invention is used for car navigation systems and mobile game machines, a liquid crystal display device is preferably used among others since the manufacturing cost and the size can be reduced. The coordinates of the cursor C and the buttons B1 to Bn are determined assuming that the horizontal direction and the vertical direction of the display means 1 are the x-axis and the y-axis, respectively. As shown in FIG. 8, attractive areas A1 to An of the cursor C are arranged around the buttons B1 to Bn, respectively. Only when the cursor C is moved into the attractive areas A1 to An is the cursor C attracted to the center of the closest one of the above-described buttons displayed on the display means 1 by driving first and second external force generation portions 23 and 24.

As shown in FIG. 1, the input means 2 includes a mechanism portion 21 having a pivoted lever 21a, an operating portion 22 attached to a top end of the pivoted lever 21a, the first and second external force generation portions 23 and 24 for providing an attractive force to the operating portion 22 via the pivoted lever 21a, and first and second detecting portions 25 and 26 for detecting the amounts of operational movement in the two orthogonal directions of the pivoted lever 21a.

As shown in FIGS. 2 and 3, the mechanism portion 21 includes the pivoted lever 21a, a casing 31, a lever-holding shaft 32, and a swing arm 33, both of which are rotatably supported by the casing 31. The lever-holding shaft 32 and the swing arm 33 are orthogonally disposed to each other. The pivoted lever 21a is attached to the lever-holding shaft 32 so that the pivoted lever 21a can rotate only in the rotational direction of the swing arm 33. Reference numeral 21b in the drawing denotes a central shaft of pivotal movement of the pivoted lever 21a. On the other hand, the swing arm 33 has a long slit 33a so that a lower end of the pivoted lever 21a passes through. The width of the long slit 33a is slightly greater than the diameter of the lower end of the pivoted lever 21a. When the pivoted lever 21a swings in the rotational direction of the lever-holding shaft 32, namely, in the direction X-X, the lower end of the pivoted lever 21a can freely swing in the long slit 33a. In contrast, when the pivoted lever 21a swings in the rotational direction of the central shaft 21b, namely, in the direction Y-Y, the swing arm 33 can swing along with the pivoted lever 21a.

Thus, the pivoted lever 21a can swing in any direction about the lever-holding shaft 32 and the central shaft 21b. The lever-holding shaft 32 rotates by an amount of rotation in proportion to an amount of pivotal movement of the pivoted lever 21a in the X-X direction. The swing arm 33 rotates by an amount of rotation in proportion to an amount of pivotal movement of the pivoted lever 21a in the Y-Y direction.

The operating portion 22 has a shape and a size that an operator can manipulate. A selection switch 22a for selecting one of the buttons B1 to Bn displayed on the display means 1 is disposed as a part of the operating portion 22.

The first external-force generation portion 23 is coupled with the lever-holding shaft 32 and drives the operating portion 22 so that the operating portion 22 moves in the x-axis direction of the display means 1. In contrast, the second external-force generation portion 24 is coupled with the swing arm 33 and drives the operating portion 22 so that the operating portion 22 moves in the y-axis direction of the display means 1. An electric actuator, such as a motor and a solenoid, may be used as the first and second external-force generation portions 23 and 24. When a linear actuator, such as a linear motor and a solenoid, is used as the first and second external-force generation portions 23 and 24, an appropriate power transfer mechanism is disposed between the first external-force generation portion 23 and the lever-holding shaft 32 and between the second external-force generation portion 24 and the swing arm 33 so that linear motion of the first and second external-force generation portions 23 and 24 is converted to rotary motion of the lever-holding shaft 32 and the swing arm 33, respectively.

The first and second detecting portions 25 and 26 detect rotational directions and amounts of rotational movement of the rotational shafts and convert them to electric signals in accordance with the detected result in order to output them. For example, a rotary encoder or a rotary variable resistor may be used as the first and second detecting portions 25 and 26. The rotational shaft of the first detecting portion 25 is coupled with the lever-holding shaft 32 and the rotational shaft of the second detecting portion 26 is coupled with the swing arm 33.

As shown in FIG. 1, the control means 3 includes an input unit 41, an arithmetic unit 42, a storage unit 43, first and second driver circuits 44 and 45, a third driver circuit 46, and a CPU 47. The input unit 41 receives a first operational amount signal a output from the first detecting portion 25, a second operational amount signal b output from the second detecting portion 26, and a switching signal c output from the selection switch 22a. The arithmetic unit 42 calculates a moving direction and moving distance of the cursor C based on the first and second operational amount signals a and b, and driving signals d and e for driving the first and second external-force generation portions 23 and 24 based on the first and second operational amount signals a and b. Also, the arithmetic unit 42 switches display screens based on the switching signal c. The storage unit 43 stores formulae and coefficients for the calculation and the coordinates of the centers of the buttons B1 to Bn. The first and second driver circuits 44 and 45 drive the first and second external-force generation portions 23 and 24 by outputting external-force generation driving electric power g and h in accordance with the driving signals d and e output from the arithmetic unit 42. The third driver circuit 46 drives the display means 1 by outputting display-means driving electric power i in accordance with a display-means driving signal f output from the arithmetic unit 42. The CPU 47 controls the above-described units 41 to 46.

As shown in FIG. 4A, when the operating portion 22 is operated, the arithmetic unit 42 calculates a moving direction and moving distance of the cursor C displayed on the display means 1 based on the first and second operational amount signals a and b and formulae and coefficients stored in the storage unit 43, and then causes the cursor C displayed on the display means 1 to move in the direction corresponding to the operational direction of the operating portion 22 by a distance corresponding to the operational amount of the operating portion 22 based on the calculation result.

Additionally, as shown in FIG. 4B, the arithmetic unit 42 finds a button displayed at the closest position from the cursor C based on the coordinates (x, y) of the current position of the cursor C and the coordinates (x1, y1) of the center of each of the buttons B1 to Bn. That is, in the example shown in FIG. 4B, a button B5 is found. The arithmetic unit 42 then drives the first and second external-force generation portions 23 and 24 so as to attract the cursor C to the center of the found button.

As shown in FIG. 4C, in order to attract the cursor C to the center of each of the buttons B1 to Bn, for example, an attractive force |F| provided to the operating portion 22 by the first and second external-force generation portions 23 and 24 is linearly increased in accordance with the distance from the cursor C to the center of each of the buttons B1 to Bn when the cursor C is positioned outside a predetermined radius P1 from the center of each of the buttons B1 to Bn. When the cursor C is positioned between the radius P1 and a predetermined radius P2, the attractive force |F| is set to constant. When the cursor C is positioned outside the radius P2, the attractive force |F| is linearly decreased in accordance with the distance from the cursor C to the center of each of the buttons B1 to Bn.

However, as shown in FIG. 5, when the cursor C moves on a line M2 parallel to a line M1 between a center O1 of the button B1 and a center O2 of the button B2, an area is determined between a position P1, which corresponds to the center O1 of the button B1, and a position P2, which corresponds to the center O2 of the button B2, such that the area extends a distance W on both sides of a mid-point Pm between the positions P1 and P2. In this area, the first and second external-force generation portions 23 and 24 are controlled so that a scalar value |F| of the attractive force exerted on the operating portion 22 is decreased according to the equation |F|=d/W·|F| as the cursor C moves closer to the mid-point Pm, where d is a distance between the cursor C and the mid-point Pm. That is, an adjusting method of the attractive force |F| according to the embodiment is characterized in that, as shown in FIG. 6, both a component force Fx of the attractive force |F| in the x-axis direction generated by the first external-force generation portion 23 and a component force Fy of the attractive force |F| in the y-axis direction generated by the second external-force generation portion 24 are decreased when the cursor C moves on the line M2.

Accordingly, as shown in FIGS. 7A and 7B, even when the cursor C moves from the left of the button B1 to the right of the button B2 on the line M1 between the center O1 of the button B1 to the center O2 of the button B2, and even when the cursor C moves from the left of the button B1 to the right of the button B2 on the line M2 parallel to the line M1, the strength of the attractive force |F| provided to the operating portion 22 does not change abruptly. Therefore, in the input device according to the embodiment, no unnatural click sensation occurs when the cursor C passes across a borderline Pm between the attractive areas.

A distance L between the current position of the cursor C and the center of each of the buttons B1 to Bn displayed on the display means 1 is given by the following equation:

$$L=\sqrt{[(x-x1)^2+(y-y1)^2]},$$

where the coordinates of the current position of the cursor C is (x, y) and the center of each of the buttons B1 to Bn displayed on the display means 1 is (x1, y2).

Additionally, the component force Fx of the attractive force |F| in the x-axis direction generated by the first external-force generation portion 23 and the component force Fy of the attractive force |F| in the y-axis direction generated by the second external-force generation portion 24 are given by the following equations:

$$Fx=-\cos\theta \times F$$

$$Fy=-\sin\theta \times F$$

$$\cos\theta=(x-x1)/L$$

$$\sin\theta=(y-y1)/L,$$

where θ is a slope angle of the attractive force F with respect to the x-axis of the display means 1.

As described above, when a plurality of the buttons B1 to Bn are displayed on the display means 1, the input device according to the embodiment controls driving of the first and second external-force generation portions 23 and 24 based on the relationship between the positions of the borderline Pm of the attractive areas and the cursor C. Consequently, no unnatural click sensation occurs when the cursor C passes across a borderline Pm between the attractive areas by controlling the first and second external-force generation portions 23 and 24 so as not to change the strength of the attractive force |F| abruptly at the borderline Pm.

Additionally, the input device according to the embodiment controls driving of the first and second external-force generation portions 23 and 24 so that the attractive force |F| decreases as the distance between the cursor C and the borderline Pm decreases. Consequently, the strength of the attractive force |F| does not abruptly change at the borderline Pm and, therefore, no unnatural click sensation occurs when the cursor C passes across the borderline.

In the above-described embodiment, two buttons B1 and B2 are arranged along the x-axis direction of the display means 1. However, in the case where two buttons B1 and B2 are arranged along the y-axis direction of the display means 1 or are arranged at an angle with respect to the x-axis and y-axis directions, driving of the first and second external-force generation portions 23 and 24 can be controlled in the same manner.

In addition, in the above-described embodiment, attractive areas A1 to An of the cursor C are arranged around the buttons B1 to Bn and, only when the cursor C is moved into the attractive areas A1 to An, an attractive force that attracts the cursor C to the center of the closest one of the above-described buttons displayed on the display means 1 is provided to the operating portion 22. However, instead of arranging attractive areas of the cursor C around the buttons B1 to Bn, a force that attracts the cursor C positioned outside the centers of the buttons B1 to Bn to the center of a button displayed at a position closest to the cursor C may be applied at all times.

Furthermore, although the input device includes the operating portion 22 of a joystick type in the above-described embodiment, the present invention can be applied to an input device of a mouse type.

What is claimed is:

1. A force-feedback input device comprising:
    display means for displaying a cursor and a plurality of buttons;
    input means comprising an operating portion, a detecting portion for detecting an amount of movement of the operating portion, and an actuator for providing a required external force to the operating portion; and
    control means for controlling display of the cursor based on an operational amount signal from the detecting portion and for controlling driving of the actuator so as to provide an attractive force to the operating portion based on a positional relationship between the cursor and the buttons;
    wherein the control means controls driving of the actuator based on a positional relationship between the cursor and a borderline between a first attractive area and a second attractive area appearing in vicinities of adjacent first and second buttons such that the attractive force decreases as a first distance between the cursor and the borderline decreases; and
    wherein the cursor moves on a first line parallel to a second line between a first center of the first button and a second center of the second button in an area determined between a first position corresponding to the first center of the first button and a second position corresponding to the second center of the second button such that the area extends a second distance on both sides of a midpoint between the first position and the second position and wherein the control means controls driving of the actuator such that a scalar value (|F|) of the attractive force exerted on the operating portion is decreased based on an equation $$|F|=d/W\cdot|F|$$

as the cursor moves towards the midpoint, where d is a third distance between the cursor and the midpoint and W represents the second distance.

* * * * *